R. M. G. PHILLIPS.

GAS FURNACE.

APPLICATION FILED AUG. 7, 1918.

Reissued Nov. 26, 1918.

14,557.

2 SHEETS—SHEET 1.

Inventor
Ross M. G. Phillips
by Seymour Hare
Atty

THE NORRIS PETERS CO., PHOTO-LITHO., WASHINGTON, D. C.

R. M. G. PHILLIPS.
GAS FURNACE.
APPLICATION FILED AUG. 7, 1918.
Reissued Nov. 26, 1918.
14,557.
2 SHEETS—SHEET 2.
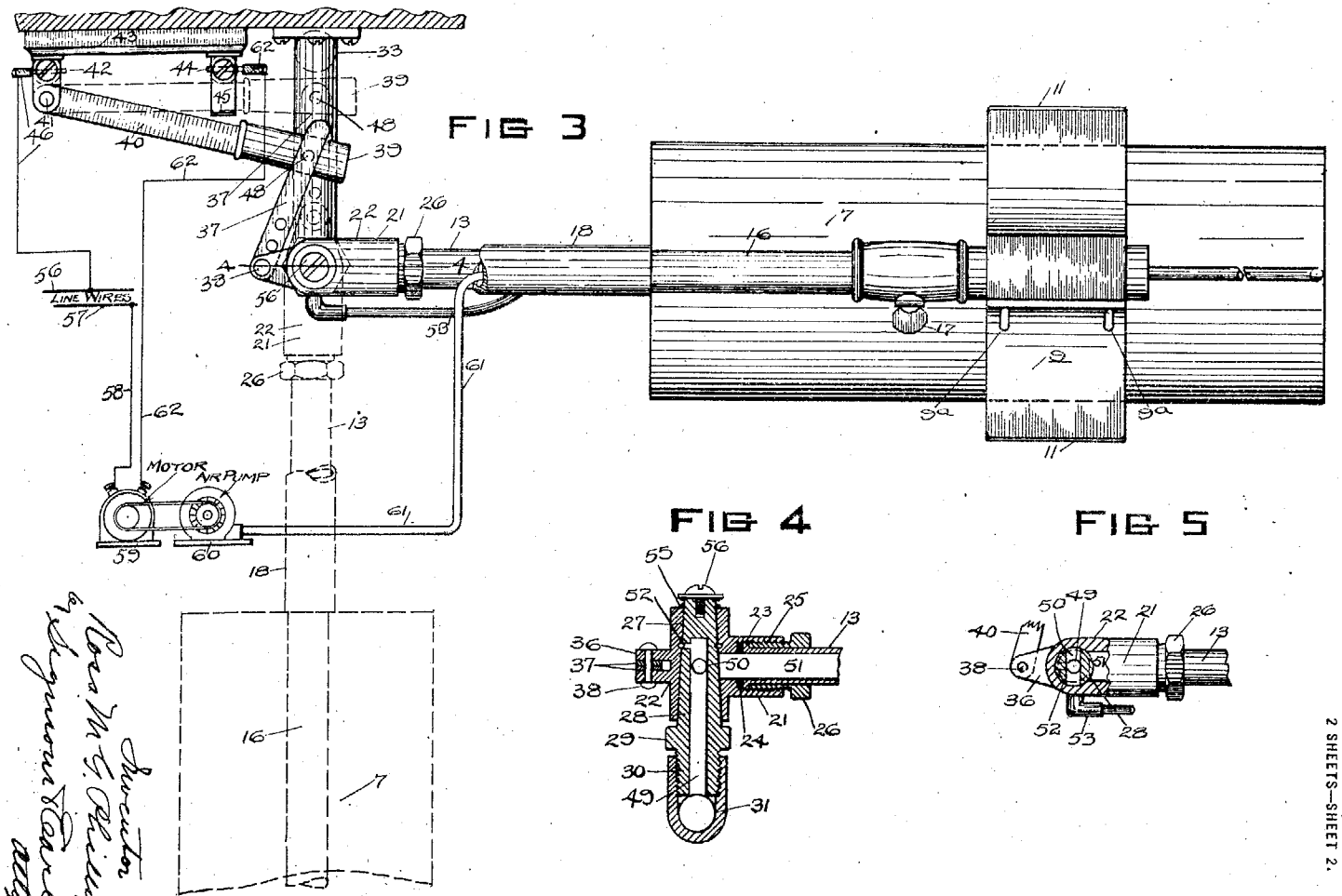
Inventor
Ross M. G. Phillips
by Seymour & Earle
Attys
THE NORRIS PETERS CO., PHOTO-LITHO., WASHINGTON, D. C.

UNITED STATES PATENT OFFICE.

ROSS M. G. PHILLIPS, OF NEW HAVEN, CONNECTICUT, ASSIGNOR TO THE SENTINEL MFG. CO., OF NEW HAVEN, CONNECTICUT, A CORPORATION.

GAS-FURNACE.

14,557. Specification of Reissued Letters Patent. Reissued Nov. 26, 1918.

Original No. 1,237,090, dated August 14, 1917, Serial No. 110,888, filed July 24, 1916. Application for reissue filed August 7, 1918. Serial No. 248,808.

*To all whom it may concern:*

Be it known that I, Ross M. G. Phillips, a citizen of the United States, residing at New Haven, in the county of New Haven and State of Connecticut, have invented a new and useful Improvement in Gas-Furnaces; and I do hereby declare the following, when taken in connection with the accompanying drawings and the characters of reference marked thereon, to be a full, clear, and exact description of the same, and which said drawings constitute part of this application, and represent, in—

Figure 1:
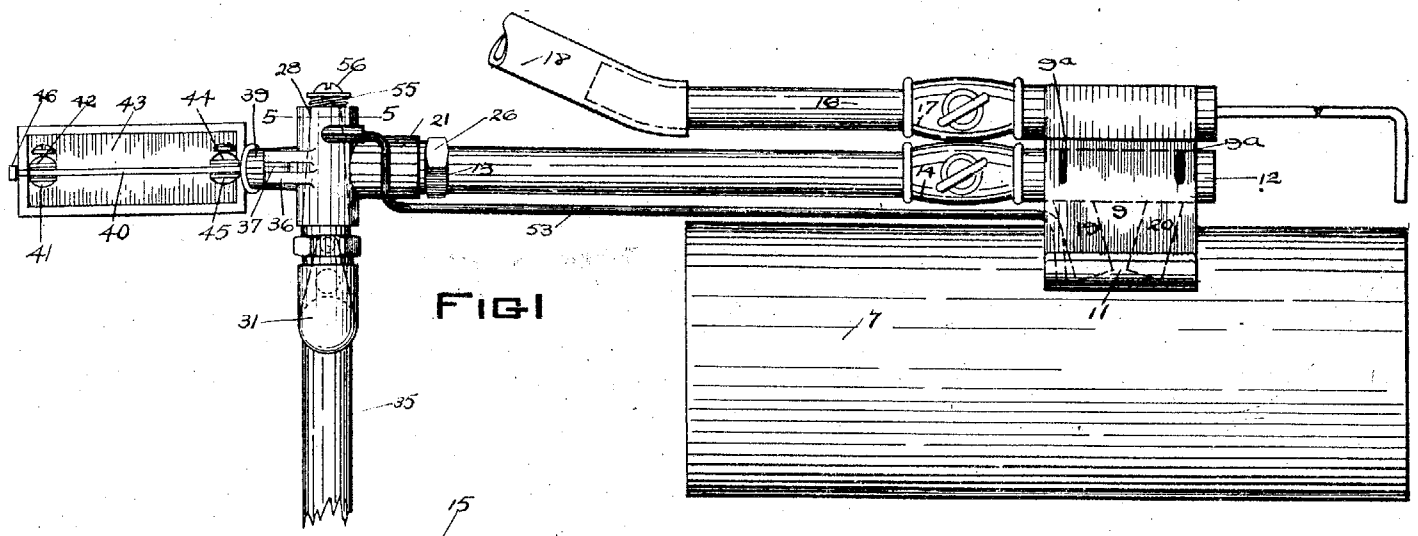

Figure 1 a broken view in side elevation of a gas-furnace constructed in accordance with my invention.

Figure 2:
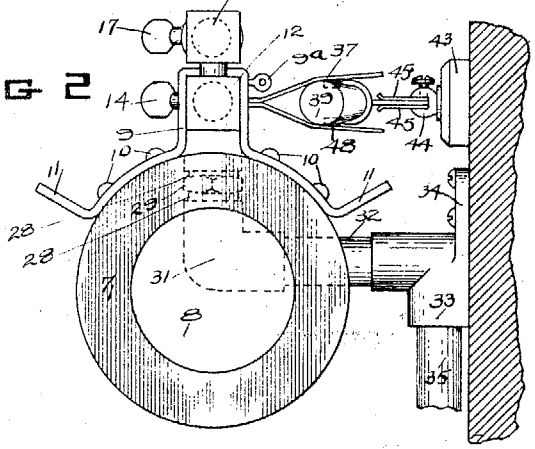

Fig. 2 an end view thereof.

Fig. 3 a plan view thereof showing the heating-chamber of the furnace in its retired position by full lines, and in its active position by broken lines.

Fig. 4 a vertical sectional view on the line 4—4 of Fig. 3.

Figure 5:
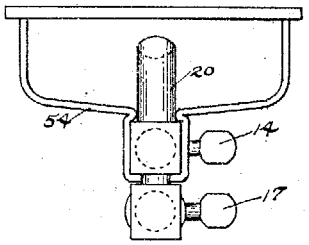

Fig. 5 a view in transverse section on the line 5—5 of Fig. 1.

Fig. 6 an end view showing the use of the device as a stove.

My invention relates to an improvement in small gas-furnaces of the type which are used for heating soldering irons, small rods, and the like, the object being to provide a simple, convenient and effective furnace constructed with particular reference to automatically turning on and shutting off the gas and air-supply when the furnace is swung into its active and retired positions, respectively.

With these ends in view, my invention consists in a swinging gas-furnace for heating soldering irons, rods and the like, characterized by having automatic fuel-control and thereto having certain details of construction and combinations of parts as will be hereinafter described and pointed out in the claims.

In carrying out my invention as herein shown, I employ a horizontally arranged circular sheet-metal heating-chamber 7 lined with firebrick, or equivalent material, and formed at its forward end with a circular opening 8 for the introduction and removal of the soldering irons, and whatever else is to be heated in the chamber. The said chamber is provided upon its upper face with two corresponding suspension-straps 9 secured to it by rivets 10 and having their lower ends upturned at a low angle to form soldering-iron rests 11. The upper ends of the said straps 9 are perforated for the reception of removable pins $9^a$ also passing transversely through the upper portion of a jet-block 12 from which the said heating-chamber is thus suspended. The said jet-block 12 is applied to a swinging, horizontally arranged gas-pipe 13 furnished near its outer end with a gas-regulating cock 14. A corresponding jet-block 15 superimposed upon the jet-block 12 receives the outer end of an air-pipe 16 furnished with an air-regulating cock 17 and having its inner end connected with a flexible air-supply pipe 18 leading to an air pump 60 of any approved construction. Leading downward from the jet-block 12 into the chamber 7 are jets 19 and 20 from which a burning mixture of gas and air under pressure is projected into the chamber.

At its inner end, the swinging gas-pipe 13 is entered into the internally threaded arm 21 of a swiveled T-shaped valve-body 22, the extreme inner end of the pipe being furnished with an annular flange 23 which is pressed against a packing-washer 24 by means of a bushing 25 screwed into the arm 21 and furnished at its outer end with a nut-like collar 26 for the application of a wrench. The construction just described, permits the pipe 13 to be turned in the arm 21, if desired, to reverse the position of the jets 19 and 20 as will be described later on.

The valve-body 22 is traversed by a tapered vertical opening 27 adapting it to be swiveled upon a tapered valve-plug 28 formed near its lower end with a nut-like collar 29 for the application of a wrench. The lower end of the said plug 28 has a threaded stem 30 adapting it to be screwed into the upper end of an elbow 31 connected by a short horizontal pipe 32 with a bracket-like elbow-fitting 33 provided with a fastening-plate 34 by means of which it, and hence the furnace, is secured to a wall or other convenient surface, the said fitting receiving a gas-supply pipe 35.

The valve-body 22 is also formed with an arm 36 slotted for the reception of the inner end of a two-part fork 37 pivotally connected with it by a pin 38, the outer ends of the respective members of the said fork being spread apart to embrace the handle 39 of the blade 40 of a knife-switch, the said blade 40 being swung on a pivot 41 in a terminal post 42 mounted in the bed 43. The complementary terminal post 44 is furnished with the customary spring clips 45 between which the blade is introduced, as shown in broken lines in Fig. 3, for the closing of the circuit. As schematically shown in Fig. 3, a wire 46 connects the post 42 with a line wire 56 of which the companion line wire 57 is connected by a wire 58 with an electric motor 59 belted to an air-pump 60 from which a supply pipe 61 leads to the flexible air-supply pipe 18. The post 44 of the knife-switch is connected by a wire 62 with the opposite terminal of the motor 59.

As shown in Fig. 2, the outer ends of the respective fork-members 37 are furnished with inwardly projecting studs 48 which are entered into shallow recesses formed in the handle 39. By springing the fork-members 37 apart, the fork may be disconnected from the handle to permit the manual operation of the switch.

The tapered plug 28 is formed with a vertical gas-passage 49 the upper end of which intersects a radial port 50 adapted to register with a passage 51 in the arm 21 of the valve-body 22, when the furnace 7 is swung out into its active position as shown by broken lines in Fig. 3. A circumferential groove 52 in the plug 28 is provided for supplying a small amount of gas to a pilot light pipe 53 which extends to a point adjacent to the outlets of the jets 19 and 20 shown in Fig. 1.

When my improved gas-furnace is not in use, its heating-chamber 7 is swung out of the way against the wall to which the furnace is applied at a convenient height above the floor or bench. At this time the gas is shut off with the exception of the small amount necessary to maintain the pilot-light. The switch being open and the circuit being broken through the motor of the air-pump, air is also shut off from the furnace.

To use the furnace, the heating-chamber 7 is swung through an arc of substantially 90° into the position in which it is shown by broken lines in Fig. 3, whereby the gas is automatically turned on, and whereby, also, the circuit of the motor 59 of the air-pump 60 is closed and the air-pump started. Gas and air under pressure, will, therefore, be simultaneously supplied to the chamber 7 in which they will be ignited by the pilot-light. After the furnace has been used, the chamber 7 is swung back into its retired position at which time the gas and air will be automatically cut off in the manner already indicated by the turning of the valve-body 22 upon the plug 28 and the opening of the blade-switch.

In case it is desired to use the furnace for heating the middle portions of long rods, or the like, the chamber 7 is left in its retired position and the gas turned on by turning the gas-plug 28 by means of its nut-like collar 29, while the current is turned on for the operation of the motor of the air-pump by disconnecting the handle 39 from the fork 37, and operating the blade 40 manually.

If desired, the chamber 7 may be removed from the other parts of the fixture, by withdrawing the pins 9ᵃ. The pipe 13 may then be given a half turn on its longitudinal axis, and the jets 19 and 20 thus inverted. A frame 54 may then be applied to the blocks 12 and 15 as shown in Fig. 6 for the use of the apparatus as a stove.

The valve-body 22 is held down upon the plug 28 so as to form a gas-tight joint and to take up wear by means of a spring 55 encircling the projecting upper end of the plug, resting upon the upper end of the valve-body and impinging against a screw 56 entering the plug as shown in Fig. 4.

I claim:—

1. In a swinging gas-furnace having automatic gas and air-control, the combination with a heating-chamber, of means for mounting the same to swing into active and retired positions, a gas-valve controlled by the swinging of the chamber to turn on and shut off the gas when the chamber is swung into its active and retired positions respectively, and an electric switch for opening and closing the circuit to the motor of an air-pump, and also operated by the swinging of the chamber.

2. In a swinging gas furnace, having automatic gas and air-control, the combination with a heating-chamber, of a gas-supply pipe for mounting the same, a swinging valve-body mounting the said gas-pipe, a valve constructed to turn on the gas and shut off the same by the swinging of the heating-chamber into its active and retired positions, and an electric switch connected with the valve-body and operated by the swinging movement thereof for opening and closing the current through the motor of the air-pump, and an air-pipe for supplying air for admixture with the gas.

3. In a swinging gas-furnace for automatic gas and air control, the combination with a heating-chamber, a gas-pipe mounting the same, a swinging valve-body, a valve-plug, a bracket-mounting the same, the said valve-plug and valve-body being adapted to admit gas to the said gas-pipe when the heating chamber is swung into its active position and to shut off the gas from the said pipe when the chamber is swung into its retired position, an electric switch operated by the swinging movement of the valve-body and making and breaking the current through a motor connected with the air-pump, and an air-pipe supplying air under pressure for admixture with the gas.

4. In a swinging gas-furnace having automatic gas and air control, the combination with a heating-chamber, of a gas-pipe mounting the said chamber which is removable from it, a valve-body mounting the gas-pipe in which it may be rotated to invert its position, an electric switch connected with the swinging valve-body for operation thereby in opening and closing a current through the motor of an air-pump, and an air-pipe for supplying air under pressure for admixture with the gas supplied to the heating-chamber.

5. In a swinging gas-furnace having automatic gas and air control, the combination with a heating-chamber, of a gas-pipe mounting the same, a swinging valve-body mounting the gas-pipe, a valve-plug mounting the said valve-body and adapted to be manually turned within the same, a bracket for supporting the said valve-plug which is constructed with respect to the said valve-body to turn the gas on and off by the swinging of the heating-chamber, and hence the valve-body into its retired and active positions, an electric switch connected with the valve-body for operation thereby to close and open a current through the motor of an air-pump, means for disconnecting the said valve-body and switch for the operation of the latter independently of the swinging movement of the valve-body, and an air-pipe for supplying air for admixture with the gas supplied to the heating-chamber.

6. In a swinging gas-furnace, the combination with a heating-chamber, of a gas-pipe, a jet-block carried thereby, straps secured to the heating-chamber and adapted to be engaged with the said jet-block for suspending the heating-chamber from the said pipe, a swinging valve-body mounting the said gas pipe, a plug mounting the valve-body, a bracket mounting the said plug which is constructed with reference to the valve-body to turn the gas off and on by the swinging of the heating-chamber into its active and retired positions, a switch connected with the valve-body and operated thereby for opening and closing a circuit through the motor of an air-pump, and an air-pipe for supplying air for admixture with the gas supplied to the heating-chamber.

7. In a gas-furnace, the combination with a heating-chamber, of a gas-pipe, a jet-block carried thereby, straps secured to the heating-chamber and adapted at their upper ends to suspend the same from the said block and having their lower ends adapted to form rests, a swinging valve-body mounting the said gas-pipe, a valve-plug mounting the said valve-body, a bracket for mounting the valve-plug and constructed with reference to the valve-body for turning the gas on off as the heating-chamber is swung into its active and into its retired positions, an electric-switch operated by the swinging of the valve-body, for opening and closing a circuit through the motor of an air-pump, and an air-pipe for supplying air for admixture with the gas supplied to the heating-chamber.

8. In a swinging gas-furnace having automatic gas and air-control, the combination with a heating-chamber, of means for mounting the same to swing into active and retired positions, a gas-valve controlled by the swinging of the chamber to turn on and shut off the gas when the chamber is swung into its active and retired positions respectively, and an air-control operated by the swinging of the said chamber and controlling the delivery of air thereto in consonance with the supply of gas thereto.

9. In a swinging gas-furnace, having automatic gas and air-control, the combination with a heating-chamber, of a gas-supply pipe for mounting the same, a swinging valve-body mounting the said gas-pipe, a valve constructed to turn on the gas and shut off the same by the swinging of the heating-chamber into its active and retired positions, and an air-control connected with the said valve-body and operated by the swinging movement thereof for controlling the supply of air for admixture with the gas.

10. In a swinging gas-furnace having automatic gas and air control, the combination with a heating chamber, of means for mounting the same to swing into active and inactive positions, a gas-control connected with the said chamber for turning on the gas when the same is swung into its active position and turning off the gas when the chamber is swung into its inactive position, and an air-control operated by the swinging of the said chamber and controlling the delivery of air thereto in consonance with the supply of gas thereto.

11. In a swinging gas-furnace having automatic gas and air-control, the combination with a heating chamber, of a gas-supply pipe mounting the same, a swinging valve-body mounting the said gas-supply pipe, a gas-valve constructed to turn on the gas and shut off the same by the swinging of the said chamber into its active and inactive positions respectively, and an air-control connected with the said valve-body and operated by the swinging thereof for controlling the supply of air for admixture with the gas.

ROSS M. G. PHILLIPS.

Copies of this patent may be obtained for five cents each, by addressing the "Commissioner of Patents, Washington, D. C."